United States Patent [19]

Ellis

[11] Patent Number: 4,563,061
[45] Date of Patent: Jan. 7, 1986

[54] NIGHT VISION VIEWING SYSTEMS

[75] Inventor: Stafford M. Ellis, West Sussex, England

[73] Assignee: Marconi Avionics Limited, England

[21] Appl. No.: 633,810

[22] Filed: Jul. 24, 1984

[30] Foreign Application Priority Data

Aug. 3, 1983 [GB] United Kingdom ............... 8320945

[51] Int. Cl.$^4$ .................... G02B 23/12; G02B 23/06; G02B 23/18; G02B 23/10
[52] U.S. Cl. .................................. 350/503; 350/538; 350/547; 350/174
[58] Field of Search ......... 350/538, 503, 174, 547–549

[56] References Cited

U.S. PATENT DOCUMENTS 4,124,798 11/1978 Thompson ........................ 350/538

FOREIGN PATENT DOCUMENTS 2108702 5/1983 United Kingdom ............... 350/174

OTHER PUBLICATIONS

*Machine Design*, "Scanning the Field for Ideas", vol. 52 (1980) p. 36, Aug. 1980.

*Primary Examiner*—Jon W. Henry
*Attorney, Agent, or Firm*—Kirschstein, Kirschstein, Ottinger & Israel

[57] ABSTRACT

A helmet mounted night vision viewing system comprising a goggle arrangement supported from above the face aperture of the helmet, the goggle comprising two independent viewing arrangements, one for each eye of a wearer of the helmet, each viewing arrangement comprising an optical projector (11, 13, 15) arranged to project an intensified image of a scene ahead of the helmet wearer downwardly to an eyepiece (17) in the form of a body of refractive material (20) in front of the wearer's eye wherein light from the optical projector is reflected at an aft surface (23), towards a curved reflective surface (25) from which the light is reflected back towards the aft surface for transmission therethrough to the wearer's eye. The optical projectors each comprise an objective lens (11), image intensifier (13) and roof prism (17), the intensifier being positioned between the objective and prism so as to allow the eyepiece to be relatively small and close to the wearer's eye in the interest of lightness and compactness, thus rendering the system suitable for use in high performance aircraft.

2 Claims, 5 Drawing Figures

NIGHT VISION VIEWING SYSTEMS

This invention relates to night vision viewing systems.

More particularly the invention relates to helmet mounted night vision viewing systems of a kind suitable for use in high performance aircraft.

For such use, a viewing system, in addition to providing suitable optical performance, is required to be light and compact due to the high accelerations experienced in high performance aircraft.

One particular viewing system suitable for such use comprises a helmet having a face aperture and a night vision goggle arrangement supported on the helmet from a position above said face aperture, the goggle arrangement comprising two independent viewing arrangements, one for each eye of a wearer of the helmet. Each viewing arrangement comprises a frame part and, supported by the frame part, an optical projector and an eyepiece. The optical projector comprises an objective, a roof prism and an image intensifier arranged, when the helmet is being worn, to project an intensified image of a portion of a scene ahead of the wearer in a generally downwards direction in relation to said face aperture. The eyepiece is positioned below said projector, in front of a respective one of the eyes of the wearer, and comprises a body of light refractive material having an upper surface, and fore and aft further surfaces spanned by said upper surface, said fore further surface possessing light reflecting properties and being concavely curved towards said aft further surface. Said upper surface and fore and aft further surfaces are angularly mutually disposed so that rays of said intensified image from said optical projector enter said body at said upper surface, are substantially totally internally reflected by said aft further surface towards said fore further surface, are reflected at said fore further surface rearwardly towards said aft further surface, and finally are transmitted through said aft further surface to the wearer's eye, thereby to provide the wearer with a view of said intensified image.

Such a night vision viewing system is hereafter referred to as a night vision viewing system of the kind specified.

One night vision viewing system of the kind specified is disclosed in GB No. 2,108,702-A. In the system therein disclosed the roof prism in the projector, which serves to fold the optical path through the projector, is between the objective and the image intensifier of the projector. It is a necessary consequence of this relative disposition of the elements of the goggle that the goggle provides a large eye relief, i.e. the space between the wearer's eyes and the rearmost surfaces of the eyepieces is large. This is desirable in that it enables the wearer to see round the eyepieces to view cockpit instruments and other parts of the real world scene, but this is only achieved at the expense of relatively large eyepieces and some loss of compactness.

It is an object of the present invention to provide an improved form of night vision viewing system of the kind specified wherein this problem is alleviated.

According to the present invention, in a night vision viewing system of the kind specified, in the optical projector of each viewing arrangement, the image intensifier is positioned between the objective and the roof prism.

Such a configuration of the optical projector elements has a notable and unexpected beneficial effect permitting a design which is ergonomically very attractive. Thus the configuration enables a smaller, (but still sufficient) eye relief to be provided than is possible with the system disclosed in GB No. 2,108,702-A. This in turn means that the eyepieces may be made smaller and lighter with enhancement, rather than loss, of optical performances.

In a preferred arrangement in accordance with the invention the roof prisms and eyepieces are located at least partly within the face aperture of the helmet. The overhang of the system beyond the helmet is thus reduced.

It will be understood that the reduced weight and greater compactness of a system according to the present invention compared with the system of GB No. 2,108,702-A is very attractive from a wearer's viewpoint in high performance aircraft where linear and angular accelerations experienced are very high.

In one particular system according to the invention in each said eyepiece said fore further surface posseses both light reflecting and light transmitting properties and is positioned between fore and aft parallel planar external surfaces of said body of refractive material, thereby providing the wearer with a view through the eyepiece of the scene ahead of the wearer on which said view of the intensified image is superimposed.

One night vision viewing system in accordance with the invention will now be described, by way of example, with reference to the accompanying drawings in which.

Figure 1:
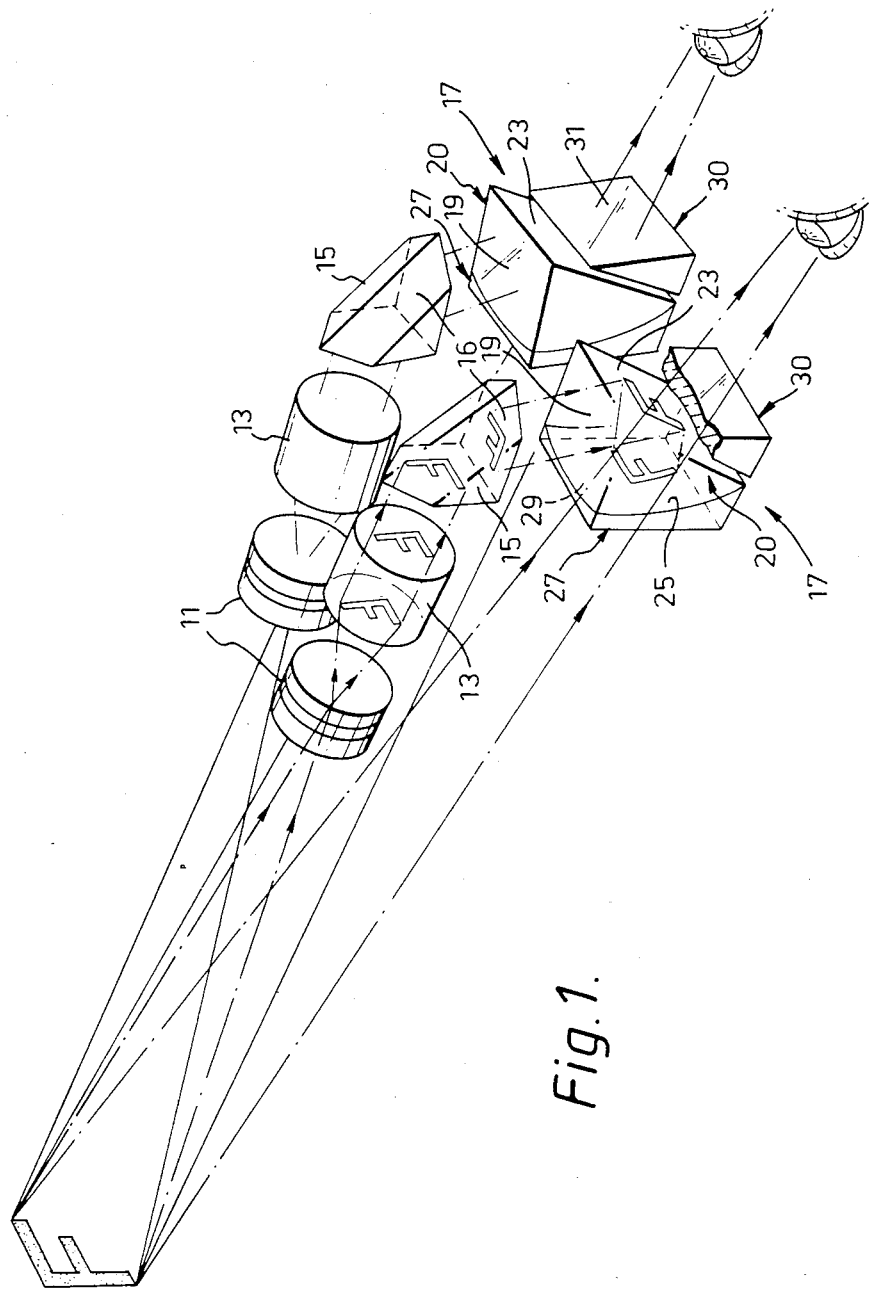
FIG. 1 is a diagram illustrating pictorially the elements of a night vision goggle arrangement incorporated in the system.
Figure 2:
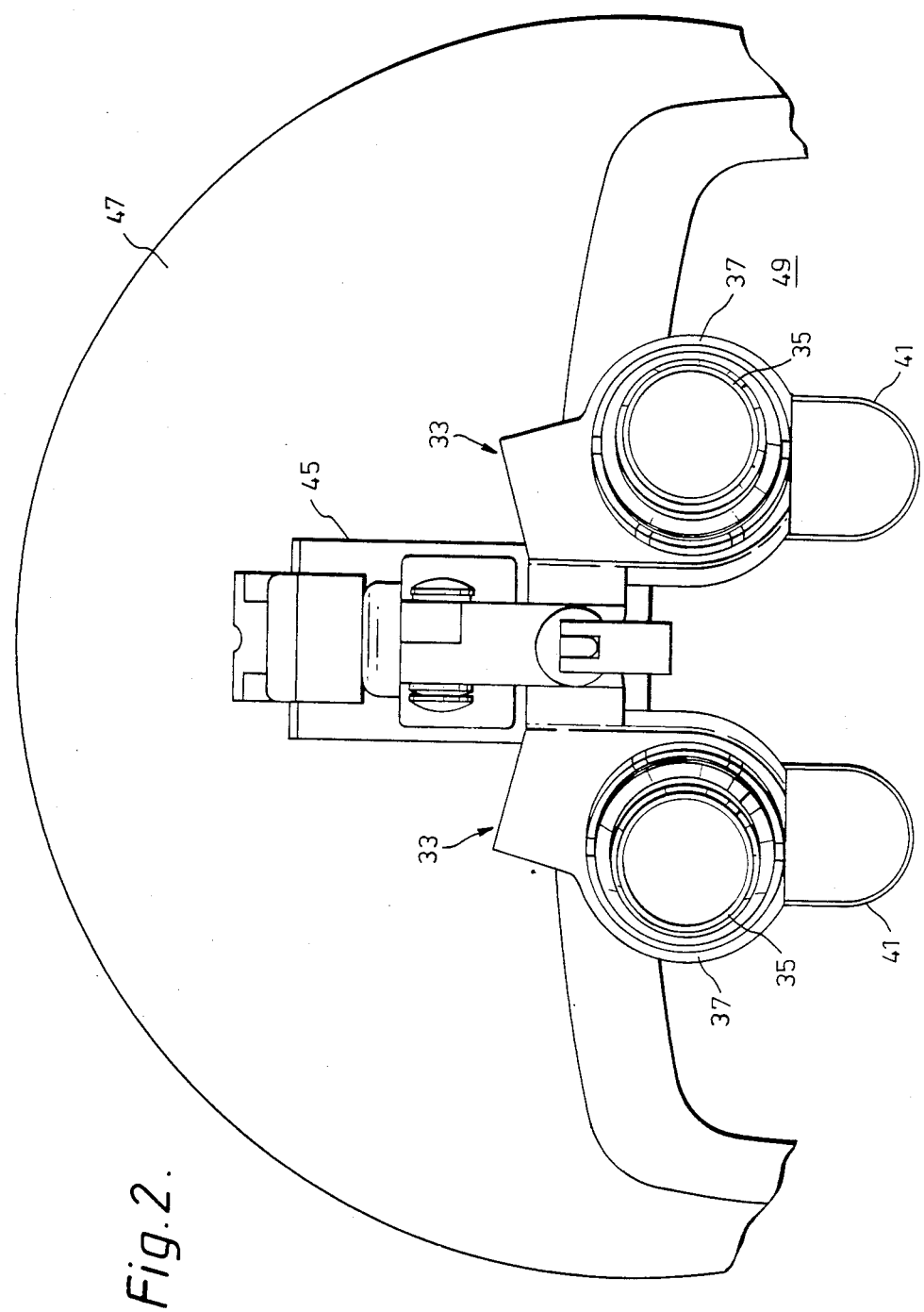
FIG. 2 is a view showing a front elevation of the goggle arrangement supported on a pilot's helmet.

The goggle has two light paths to the pilot's right and left eyes, respectively. Referring to FIG. 1, in each path there is an optical projector comprising an objective lens 11, an image intensifier 13 and a roof prism 15, and an eyepiece 17.

An inverted laterally reversed image of the distant scene ahead of a wearer of the helmet on which the goggle is mounted, represented in FIG. 1 by the letter F, is directed onto the image intensifier 13 by the objective lens 11. The intensified image at the output of the intensifier 13 is inverted, laterally reversed and folded through 90° by the roof prism 15. The exit face 16 of the roof prism 15 is in approximately parallel relationship to an input face 19 of the eyepiece 17.

The eyepiece 17 includes a central body 20 of light refractive material, preferably a transparent plastics material, the upper surface of the body 20 constituting the input face 19 of the eyepiece 17. The body 20 also has an optically flat output face 23 and a collimating light reflective surface 25 concavely curved towards the face 23. A substantial part of the light from each point of the image of the outside world formed at the exit face 16 of the roof prism 15 is, after refraction at the input face 19 of the eyepiece 17, incident on the output face 23 at angles greater than the critical angle from glass to air.

Such rays are, of course, internally reflected, the internally reflected rays being incident on the collimating reflective surface 25. After reflection at the surface 25 substantially all of the reflected light is transmitted to the helmet wearer's eyes by way of the output face 23. The wearer is thus provided with a view of the intensified image of the distant scene produced by the image intensifiers 13.

The reflective surface 25 is a surface at the interface between the central body 20 of light refractive material and a further body 27 of light refractive material bonded to the body 20 by an optical cement, the body 27 having an optically flat forward surface 29.

The surface 25 has light transmitting as well as light reflecting properties. It may be a semi-silvered mirror coating or it may be a holographic coating. The latter variety coating has the advantage of offering better light transmission of the scene viewed directly through the eyepieces 17 as further described below.

The eyepieces 17 also each include a wedge-shaped further body 30 of light refractive material disposed with one of its major faces in parallel spaced relation to the face 23 of the central body 20. The other major face 31 of the body 30 is parallel to the surface of the body 27 and constitutes the output face of the eyepiece 17.

The helmet wearer is thus provided with a view of the distant scene directly through the eyepieces 17 on which his view of the intensified image is superimposed.

Referring now also to FIGS. 2 to 5, in a practical embodiment of the goggle described above the optical elements in each light path to the observer are supported in relatively fixed relationship by a frame 33.

Each objective lens 11 is housed within a cylindrical forward portion 35 of the frame 33. The associated image intensifier 13 is within a central cylindrical housing part 37. At the rear of the housing part 37 there is a dog-house 39 containing the roof prism 15, and a case 41 supporting the eyepiece 17 is secured to the dog-house 39 below the roof prism 15, intensified light being directed downwardly by the roof prism 15 onto the eyepiece. Light from the image at the exit face 16 of the prism 15 is presented to the observer after double reflected within the eyepiece 17, as previously described.

The two frames 33 are hingedly connected to a bracket 45 releasably connected to the front of the pilot's helmet 47, above the face aperture 49 of the helmet. The goggle is angularly displaceable about the hinge axis between an operational position in which the goggle is shown in full lines in the drawings, and a stowed position S shown by chain-dashed lines in FIG. 3.

Figure 3:
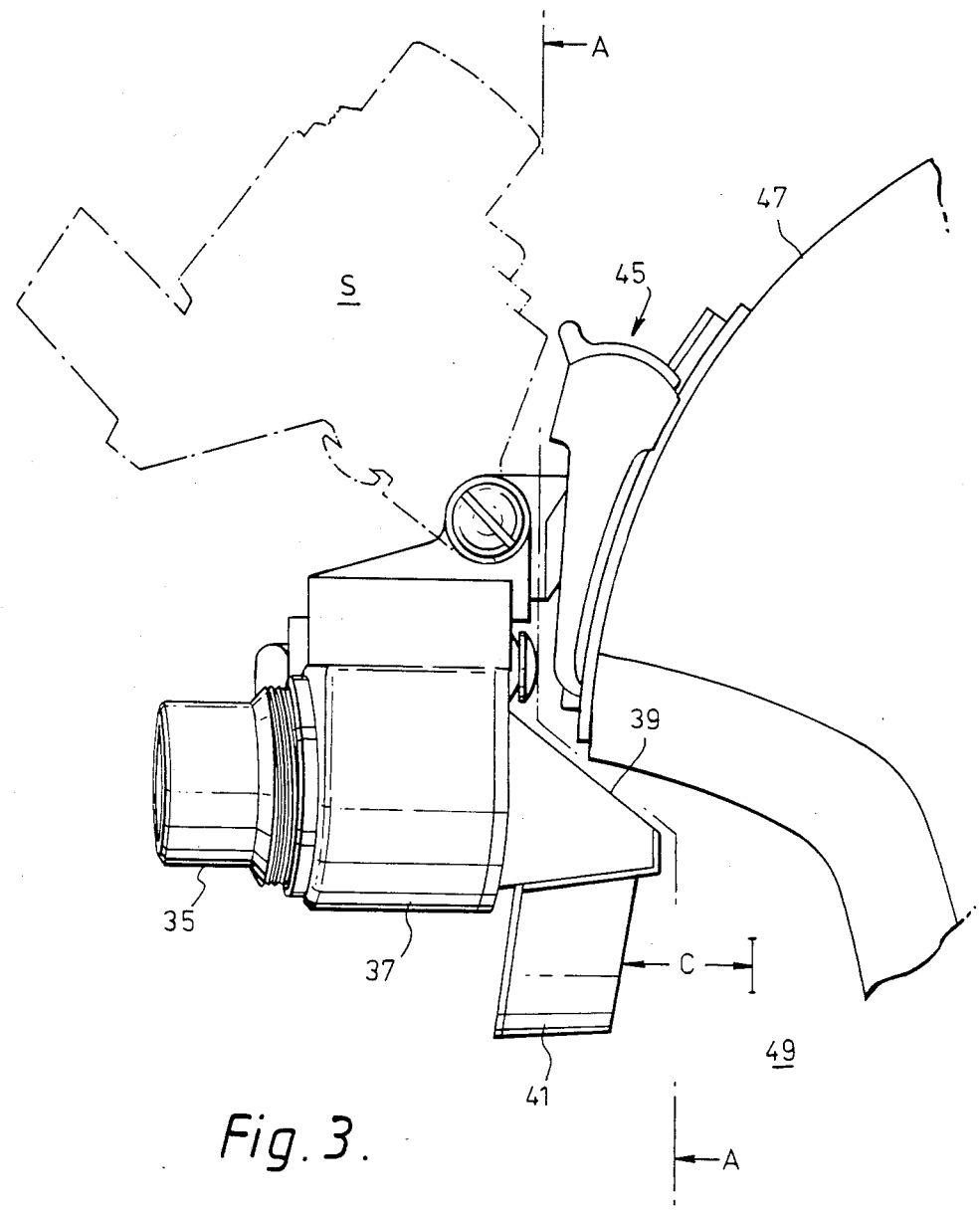
FIG. 3 is a view showing a side elevation of the goggle arrangement and helmet.
Figure 4:
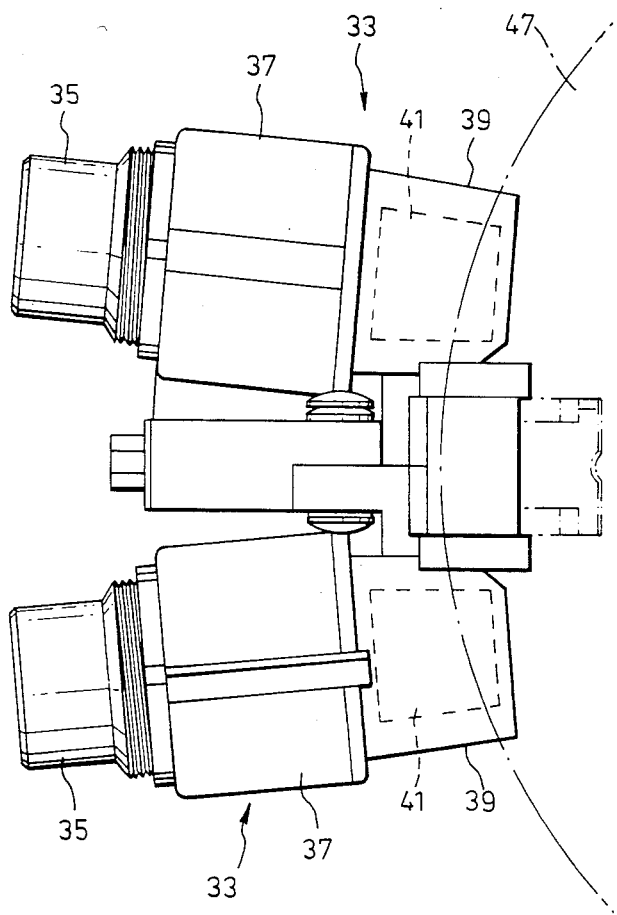
FIG. 4 is a plan view of the goggle arrangement.
Figure 5:
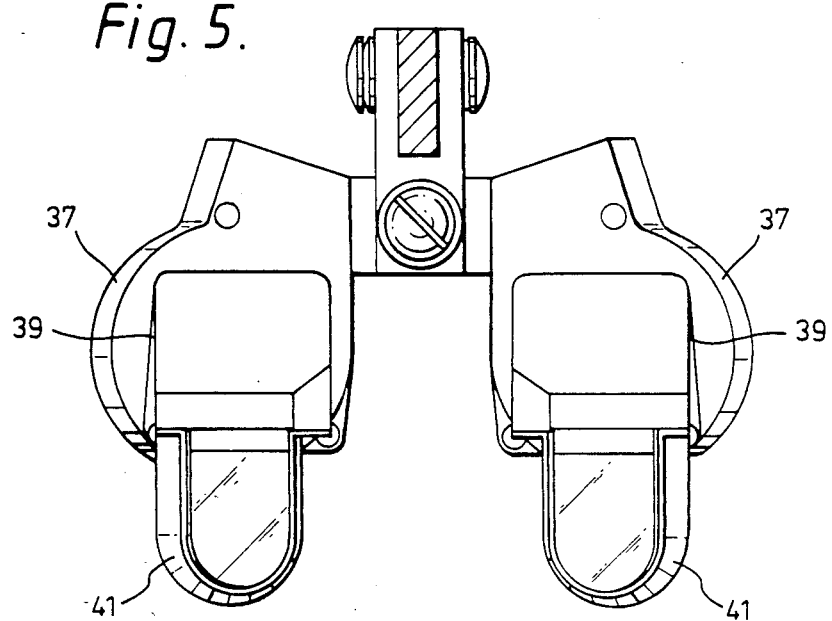
FIG. 5 is a section line on A—A in FIG. 3.

As may be seen, substantial parts of the dog-houses 39 containing the roof prisms 15 and of the eyepieces 17 with their cases 41 lie within the face aperture 49 of the helmet 47 under the front rim of the helmet. The eye clearance, indicated by C in FIG. 3, is accordingly less than that in the prior arrangement of GB No. 2,108,702-A previously mentioned, and thus permits the eyepieces 17 to be greatly reduced in size and weight without affecting the field of view.

The optical systems for the right and left eyes respectively have divergent optical axes.

I claim:

1. An ergonomically attractive night vision binocular viewing system for use in high performance aircraft comprising:
(A) a helmet having a face aperture;
(B) a night vision goggle arrangement supported on the helmet from a position above said face aperture, said night vision goggle arrangement comprising:
 (i) two independent viewing arrangements, one for each eye of a wearer of the helmet, each said viewing arrangement comprising:
  (a) a frame part;
  (b) supported by said frame part, an optical projector comprising:
   (I) an objective;
   (II) a roof prism; and
   (III) an image intensifier arranged in conjunction with said objective and roof prism so that, when the helmet is worn, an intensified image of a portion of a scene ahead of the wearer is projected in a generally downwards direction in relation to said face aperture; and
  (c) below said projector, in front of a respective one of the eyes of the wearer, an eyepiece of light refractive material having:
   (I) an upper surface;
   (II) fore and aft further surfaces spanned by said upper surface, said fore further surface possessing light reflecting and light transmitting properties, being concavely curved towards said aft further surface, and being positioned between fore and aft parallel planar external surfaces of said eyepiece;
   (III) said upper and said fore and aft further surfaces being angularly mutually disposed so that rays of said intensified image from said optical projector
    (i) enter said eyepiece at said upper surface
    (ii) are substantially totally internally reflected by said aft further surface towards said fore further surface,
    (iii) are reflected at said fore further surface rearwardly towards said aft further surface, and
    (iv) finally are transmitted through said aft further surface to the respective wearer's eye, thereby to provide the wearer at that eye with a view of said intensified image superimposed on a direct view of said scene ahead of the wearer through said eyepiece;
 (c) wherein the improvement comprises:
  (i) in the optical projector of each said viewing arrangement for each eye the associated image intensifier is positioned between the objective and the roof prism;
  (ii) said upper surface is constituted by an external planar face of a first part of said eyepiece for that eye,
  (iii) said aft further surface is constituted by a second planar face of said first part,
  (iv) said fore further surface is at an interface between a third face of said first part and a first face of a second part of said eyepiece,
  (v) said fore planar external surface is constituted by a second face of said second part, and,
  (vi) said aft planar external surface is constituted by a first face of a third part of said eyepiece, a second planar face of said third part being disposed in parallel spaced relation with said second planar face of said first part.

2. A system according to claim 1, wherein said roof prisms and eyepieces are located at least partly within the face aperture of the helmet.

* * * * *